US009366341B2

United States Patent
Burlage (10) Patent No.: US 9,366,341 B2
(45) Date of Patent: Jun. 14, 2016

(54) DISPLACEMENT LEVEL SENSOR AND SEAL AND PIVOT ASSEMBLY FOR DISPLACEMENT LEVEL SENSOR

(71) Applicant: FISHER CONTROLS INTERNATIONAL LLC, Marshalltown, IA (US)

(72) Inventor: Brian J. Burlage, Marshalltown, IA (US)

(73) Assignee: FISHER CONTROLS INTERNATIONAL LLC, Marshaltown, IA (US)

( * ) Notice: Subject to any disclaimer, the term of this patent is extended or adjusted under 35 U.S.C. 154(b) by 0 days.

(21) Appl. No.: 14/847,488

(22) Filed: Sep. 8, 2015

(65) Prior Publication Data
US 2015/0377685 A1    Dec. 31, 2015

Related U.S. Application Data

(63) Continuation of application No. 13/764,112, filed on Feb. 11, 2013, now Pat. No. 9,169,932.

(51) Int. Cl.
| | |
|---|---|
| *F16J 15/50* | (2006.01) |
| *G01F 23/36* | (2006.01) |
| *G01F 23/00* | (2006.01) |
| *F16C 11/04* | (2006.01) |
| *G01F 23/32* | (2006.01) |

(52) U.S. Cl.
CPC ............. *F16J 15/50* (2013.01); *F16C 11/04* (2013.01); *G01F 23/0038* (2013.01); *G01F 23/32* (2013.01); *G01F 23/363* (2013.01); *Y10T 403/32606* (2015.01)

(58) Field of Classification Search
CPC .......... G01F 23/363; F16J 15/50; F16J 15/52; F16J 15/15; F16J 15/525
See application file for complete search history.

(56) References Cited

U.S. PATENT DOCUMENTS

| | | |
|---|---|---|
| 2,376,473 A | 5/1945 | Brockett |
| 4,984,471 A | 1/1991 | Storer |
| 5,083,461 A | 1/1992 | Winkler |

OTHER PUBLICATIONS

"Fisher® 249 Caged Displacer Sensors," Instruction Manual, Emerson Process Management, Sep. 2012, 20 pages.
"Fisher® L2 Liquid Level Controller," Instruction Manual, Emerson Process Management, Nov. 2011, 16 pages.
International Search Report and Written Opinion for Application No. PCT/US2014/015666, dated Jun. 3, 2014.
Written Opinion of the International Searching Authority, International Application No. PCT/US2014/015666, dated Aug. 11, 2015.

*Primary Examiner* — Paul West
(74) *Attorney, Agent, or Firm* — Marshall, Gerstein & Borun LLP

(57) ABSTRACT

A seal and pivot assembly for a displacement level assembly includes a pivot base, an annular seal and a pivot body. The pivot base includes a cylindrical base member with an axial end surface defining first and second V-shaped grooves. The pivot body includes a cylindrical body member with first and second pivot body arms extending radially outward from opposite sides of the cylindrical body member. The first and second pivot body arms include first and second knife edges, respectively, that are in line contact with the first and second grooves, respectively, of the pivot base such that the pivot body can pivot relative to the pivot base, as well as uniformly distribute unbalanced forces applied to the pivot body across the entirety of the knife edges.

24 Claims, 9 Drawing Sheets

DISPLACEMENT LEVEL SENSOR AND SEAL AND PIVOT ASSEMBLY FOR DISPLACEMENT LEVEL SENSOR

CROSS-REFERENCE TO RELATED APPLICATIONS

This is a continuation of U.S. patent application Ser. No. 13/764,112, filed Feb. 11, 2013, the entire contents of which are hereby incorporated herein by reference.

FIELD OF THE DISCLOSURE

The present disclosure is directed to displacement level sensors and, more particularly, to displacement level sensors for use in high-pressure applications.

BACKGROUND

Displacement level sensors can conventionally be used to detect changes in the level of fluid in a storage tank, for example. Such uses include fluid separation applications where gas, oils, or other liquids separate into constituent forms in a separation vessel under high pressure and subsequently managed and removed in a controlled manner. The efficiency and productivity of such processes depends on the accuracy and integrity of the instruments used. The high pressures conventionally used in such storage tanks impart substantial forces on any instrumentation that is resident within or in fluid communication with the pressurized fluids. Therefore, instrumentation accuracy and integrity depend on the ability of each instrument to not only withstand a high number of performance cycles, but also exposure to high pressure for prolonged periods of time.

SUMMARY

One aspect of the present disclosure includes a displacement level sensor or a seal and pivot assembly for a displacement level sensor. In either event, the seal and pivot assembly includes a pivot base, an annular seal member, and a pivot body. The pivot base can include a cylindrical base member disposed on a longitudinal axis, an axial end surface, and a cylindrical through-bore extending through the cylindrical base member along the longitudinal axis. The axial end surface defines first and second grooves that extend along a transverse axis of the pivot base that is perpendicular to the longitudinal axis. The annular seal member is carried within the through-bore of the cylindrical base member of the pivot base. The pivot body can include a cylindrical body member disposed on the longitudinal axis, first and second pivot body arms extending radially outward from opposite sides of the cylindrical body member, and a cylindrical through-bore extending through the cylindrical body member along the longitudinal axis coaxially with the cylindrical through-bore of the cylindrical base member. The first and second pivot body arms include first and second knife edges, respectively, that extend along the transverse axis of the pivot base and in line contact with the first and second grooves, respectively. So configured, the pivot body can pivot relative to the pivot base about a pivot axis that is coaxial with the transverse axis. Another aspect of the present disclosure includes a displacement level sensor or a seal and pivot assembly for a displacement level sensor, wherein the seal and pivot assembly includes a pivot base, an annular seal, a pivot body, and first and second barrel pivots. The pivot base can include a cylindrical base member disposed on a longitudinal axis, an axial end surface, and a cylindrical through-bore extending through the cylindrical base member along the longitudinal axis. The axial end surface defines first and second grooves, each having a semi-circular shaped cross-section with a radius about a transverse axis of the pivot base that is perpendicular to the longitudinal axis. The annular seal member is carried within the through-bore of the cylindrical base member of the pivot base. The pivot body can include a cylindrical body member disposed on the longitudinal axis, first and second pivot body arms extending radially outward from opposite sides of the cylindrical body member, and a cylindrical through-bore extending through the cylindrical body member along the longitudinal axis coaxially with the cylindrical through-bore of the cylindrical base member. The first and second pivot body arms including third and fourth grooves, respectively, each having a semi-circular shaped cross-section with a radius about the transverse axis. The first and second cylindrical barrel pivots have longitudinal axes disposed on the transverse axis. The first barrel pivot is disposed between the first and third grooves and the second barrel pivot disposed between the second and fourth grooves to facilitate pivoting movement of the pivot body relative to the pivot base.

DETAILED DESCRIPTION

Figure 1:
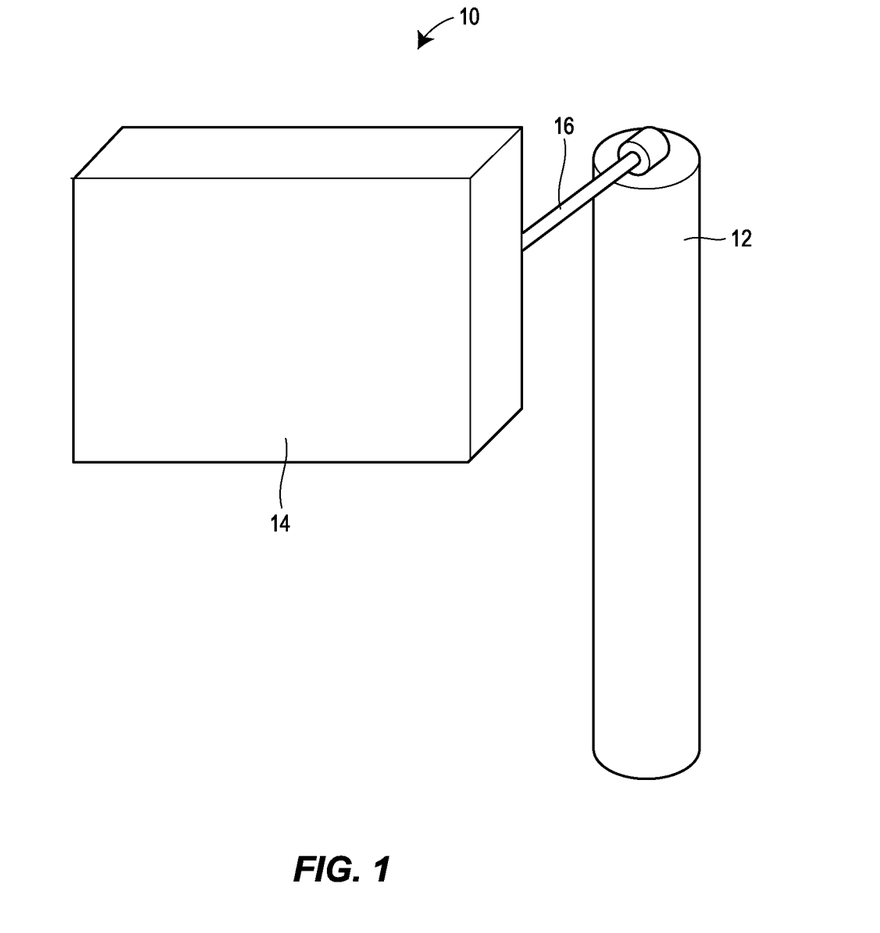
FIG. 1 is a perspective view of one version of a displacement level sensor constructed in accordance with the principles of the present disclosure.

The present application is directed to a displacement level sensor and a seal and pivot assembly for a displacement level sensor that is adapted for use in high-pressure applications for detecting, for example, fluid levels in a pressurized fluid storage tank such as an oil and gas separator. FIG. 1 depicts one version of a displacement level sensor 10 constructed in accordance with the principles of the present disclosure and including a displacer 12 operably connected to a controller 14 via a displacer rod 16. The displacer 12 is adapted to be at least partly submerged within a liquid, for example, in the pressurized storage tank (not shown). The displacer 12 can include a mass and a volume such that it floats within the liquid. Accordingly, a buoyancy force generated by the liquid acts on the displacer 12. As the level of the liquid rises, the buoyancy force acting on the displacer 12 also rises. The force acting on the displacer 12 also acts on the end of the displacer rod 16, to which it is attached, such that the force is communicated to the controller 14 via the displacer rod 16. As mentioned, the opposite end of the displacer rod 16 is operably coupled to the controller 14 and the controller is configured to sense the force communicated by the displacer rod 16 to thereby react to changes in the level of the liquid in the storage tank.

Figure 2:
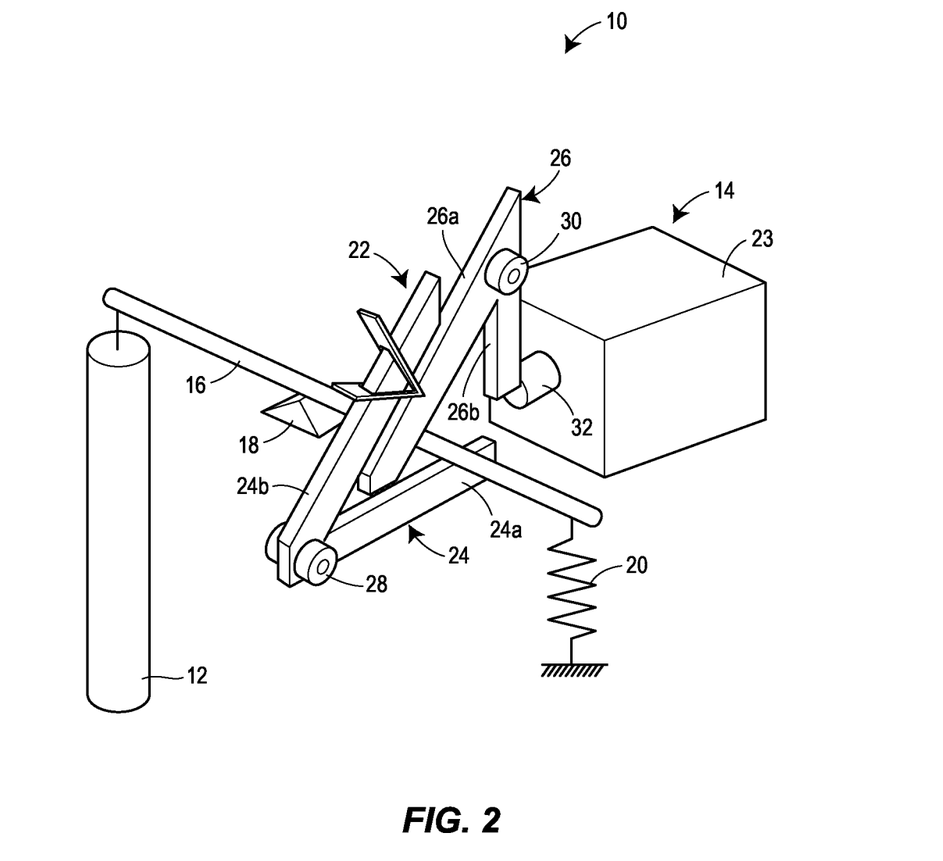
FIG. 2 is a schematic illustrating the operation of one version of a displacement level sensor constructed in accordance with the principles of the present disclosure.

FIG. 2 depicts a simple schematic of how one version of the displacement level sensor 10 operates. In the position depicted, the weight of the displacer 12 applies a force in the downward direction, which results in a counterclockwise moment applied to the displacer rod 16 about a fulcrum 18. The displacer 12 however is balanced by the force of a spring 20 attached to the opposite end of the displacer rod 16. That is, the spring 20 applies a pulling force on the end of the displacer rod 16 that is opposite the displacer 12, thereby generating a clockwise moment on the displacer rod 16 that is generally equal and opposite to the counterclockwise moment generated by the weight of the displacer 12. In the schematic in FIG. 2, the controller 14 includes a linkage 22 communicating displacement of the displacer rod 16 to a relay 23. The linkage 22 includes a first lever 24 rotatable about a first pivot point 28 and a second lever 26 rotatable about a second pivot point 30. The first lever 24 includes a horizontal sensing leg 24a and an angled communication leg 24b. The horizontal sensing leg 24a is in contact with a bottom side of the displacer rod 16 at a location between the fulcrum 18 and the spring 20 and pivots about the first pivot point 28. The angled communication leg 24b extends at an angle above the displacer rod 16 and is in sliding contact with an angled sensing leg 26a of the second lever 26. A vertical communication leg 26b of the second lever 26 extends down from the angled sensing leg 26a and in contact with a push button 32 of the relay 23.

So configured, during operation, as the liquid level in the storage tank increases, the weight of the displacer 12 decreases to create a force imbalance across the displacer rod 16. That is, the displacer rod 16 rotates clockwise about the fulcrum 18, which forces the horizontal sensing leg 24a and angled communication leg 24b of the first lever 24 downward about the first pivot point 28. This movement of the angled communication leg 24b also forces the second lever 26 to rotate relative to the second pivot point 30 such that the angled sensing leg 26a of the second lever 26 moves down. This, in turn, causes the vertical communication leg 26b of the second lever 26 to apply a force to the push button 32 in a direction toward the relay 23. In some applications, the relay 23 is configured to compensate for this force imbalance by converting it to a pressure output of a control valve, for example, to bring the forces back into equilibrium.

Figure 3:
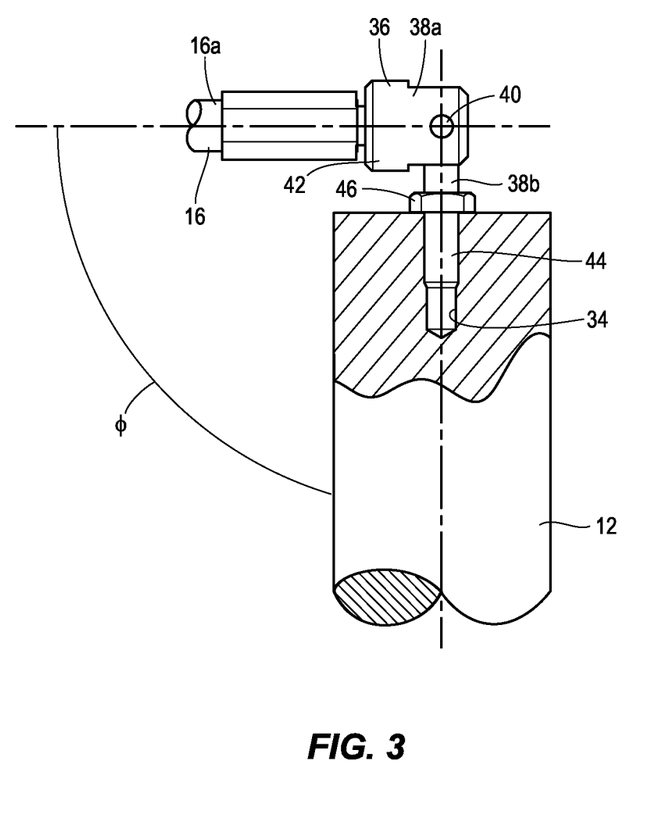
FIG. 3 is a detail view of one means for connecting a displacer and displacer rod of one version of a displacement level sensor constructed in accordance with the principles of the present disclosure.

FIG. 3 illustrates one means by which the displacer 12 of the present disclosure can be connected to the end of the displacer rod 16. As shown, the displacer 12 in FIG. 3 can include a threaded blind bore 34 and the end 16a of the displacer rod 16 can include a connecting mechanism 36. The connecting mechanism 36 can include a universal joint 38 having a yoke 38a and a support rod 38b pivotally connected to the yoke 38a with a pivot pin 40. The yoke 38a can include a cylindrical collar 42, for example, for connecting to an end of the displacer rod 16 with threads, adhesive, welding, or some other means. The support rod 38b can include a threaded shaft portion 44 threadably disposed within the blind bore 34 of the displacer 12. Finally, a hex nut 46 can be included on the threaded shaft portion 44 of the support rod 38b to be fixed down onto the displacer 12 for securing the connection between the connecting mechanism 36 and the displacer 12. The universal joint 38 so described enables the angle Φ of the displacer 12 and the displacer rod 16 to change such that the displacer 12 can advantageously be maintained in a substantially vertical orientation in the tank regardless of the specific angle of the displacer rod 16 as it rotates relative to the fulcrum 18, for example, as described with respect to the schematic in FIG. 2.

Figure 4:
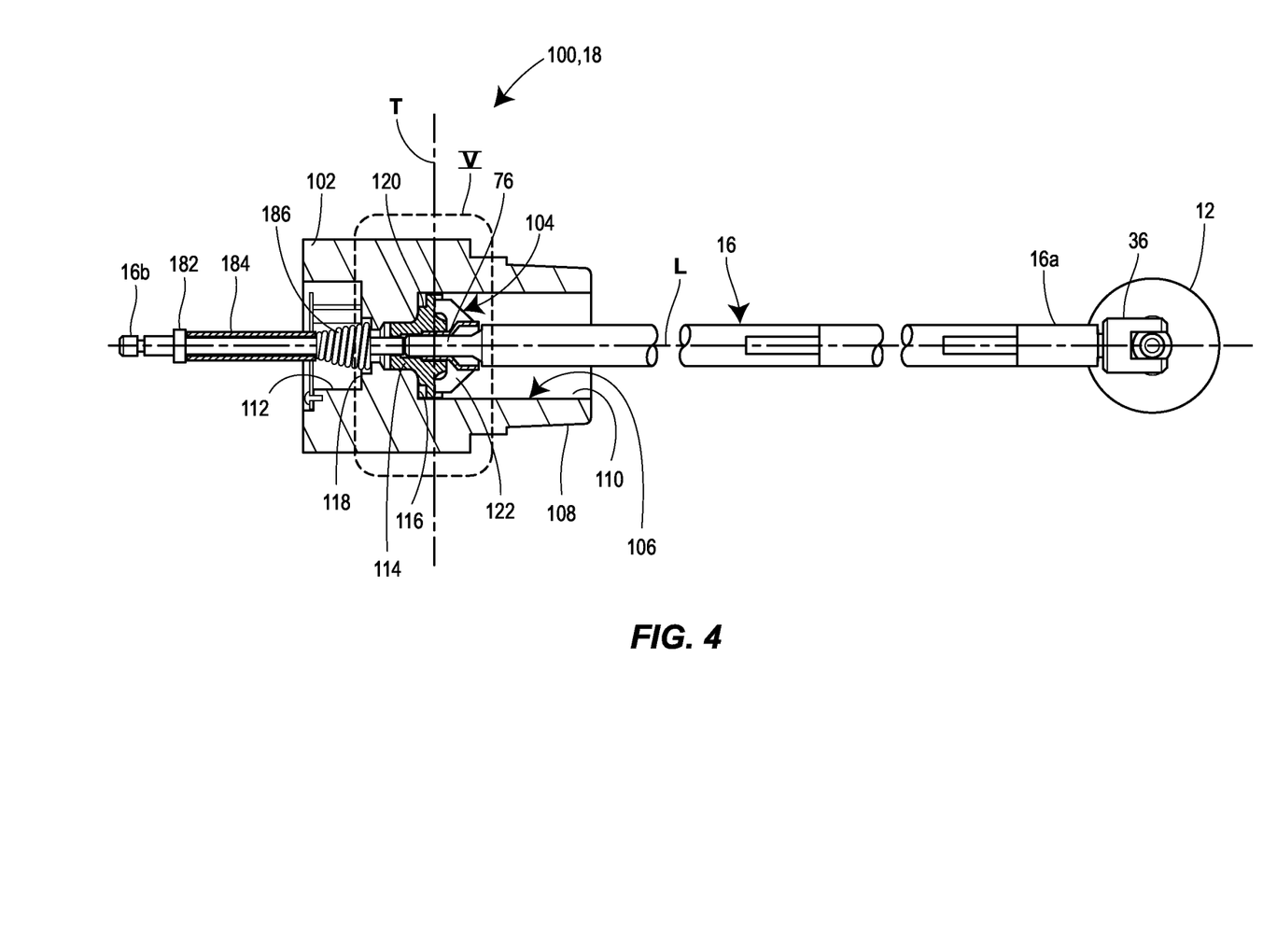
FIG. 4 is a top cross-sectional view of a displacer, displacer rod, and pivot support assembly of one version of a displacement level sensor constructed in accordance with the principles of the present disclosure.
Figure 5:
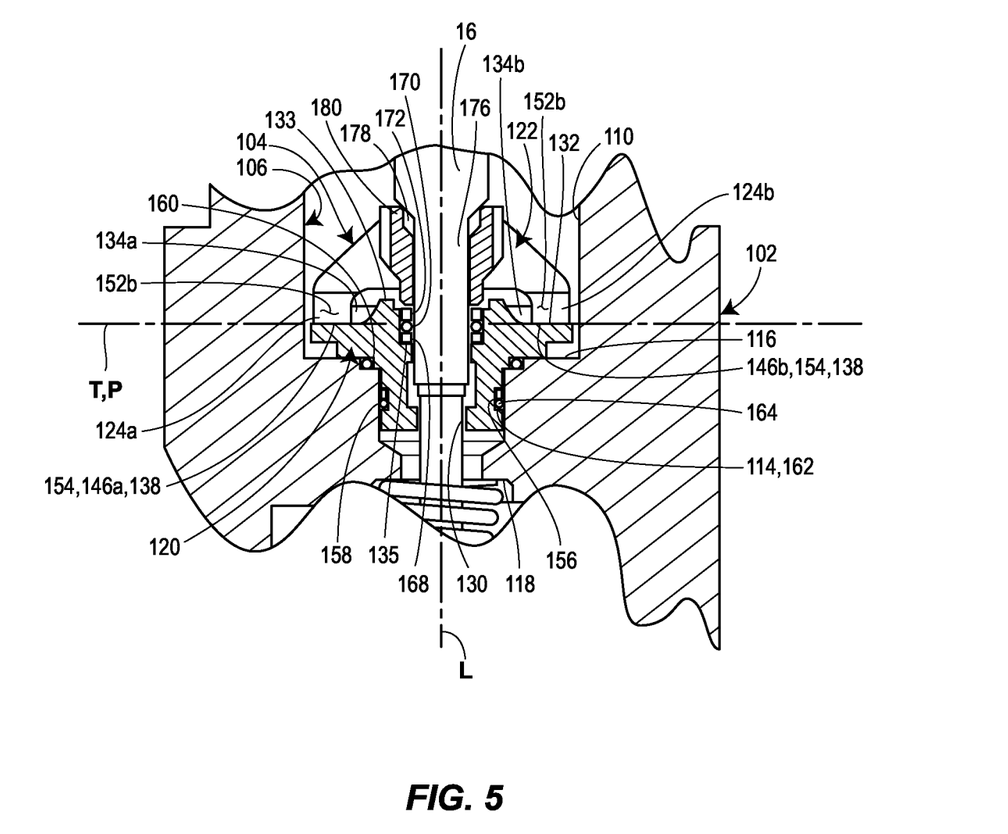
FIG. 5 is a detail view of FIG. 4 taken from boundary V of FIG. 4.

While FIG. 2 schematically depicts a simple triangular fulcrum 18, FIGS. 4 and 5 illustrate one version of the fulcrum 18 constructed in accordance with the principles of the present disclosure. As shown in FIG. 4, the displacer rod 16 includes a first end 16a and a second end 16b opposite the first end 16a. The first end 16a is attached to the displacer 12 via the universal joint 38, as described above and shown in FIG. 3. The second end 16b is supported by and extends beyond a pivot support assembly 100, which generally serves as the fulcrum 18 for the displacer rod 16. The pivot support assembly 100 includes a connector body 102 and a pivot and seal assembly 104 carried by the connector body 102. The connector body 102 includes a generally cylindrical member having a longitudinal axis L, a mounting through-bore 106 that extends along the longitudinal axis L, and an external threaded portion 108. The external threaded portion 108 is adapted to be threaded into an opening in a sidewall of a storage tank, for example, such that the displacer 12 and the portion of the displacer rod 16 between the pivot support assembly 100 and the displacer 12 are disposed in the storage tank.

Still referring to FIG. 4, the mounting through-bore 106 in the connector body 102 extends completely through the connector body 102 along the longitudinal axis L and includes an inboard portion 110, an outboard portion 112, and a throat portion 114 between the inboard and outboard portions 110, 112. The inboard and outboard portions 110, 112 have diameters that are larger than a diameter of the throat portion 114 such that the connector body 102 defines a first shoulder surface 116 between the inboard and throat portions 110, 114 of the mounting through-bore 106 and a second shoulder surface 118 between the outboard and throat portions 112, 114 of the mounting through-bore 106.

The pivot and seal assembly 104, as shown in FIG. 4 and in FIG. 5, is supported in the mounting through-bore 106 of the connector body 102 and includes a pivot base 120 and a pivot body 122. The pivot base 120 is fixedly mounted in the mounting through-bore 106 and the pivot body 122 is fixedly mounted to the displacer rod 16. As will be described in more detail, the pivot body 122 includes opposing first and second knife edges 124a, 124b disposed in engagement with an axial end surface 132 of the pivot base 120 to facilitate pivoting of the pivot body 122 and displacer rod 16 relative to the pivot base 120 when the first end 16a of the displacer rod 16 moves in response to movement of the displacer 12 in the storage tank, as will be described more completely below.

Figure 6:
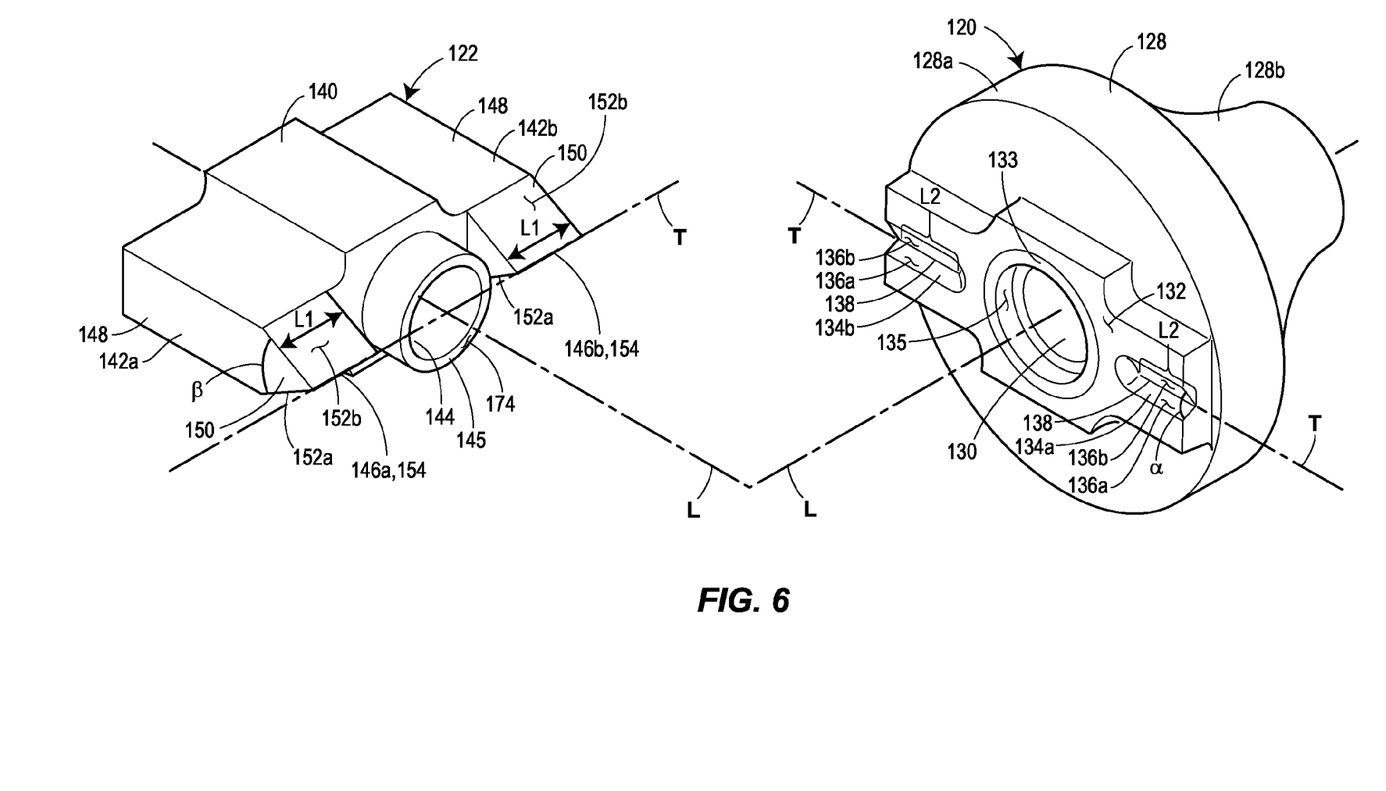
FIG. 6 is a perspective view of a pivot body and a pivot base of the pivot support assembly of FIGS. 4 and 5.
Figure 7:
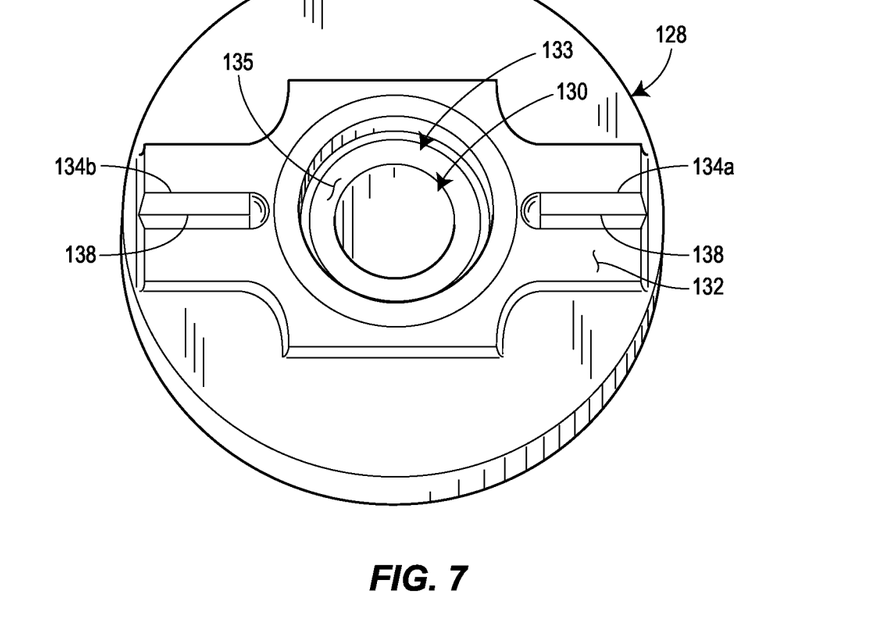
FIG. 7 is an end view of the pivot base of FIG. 6.
Figure 8:
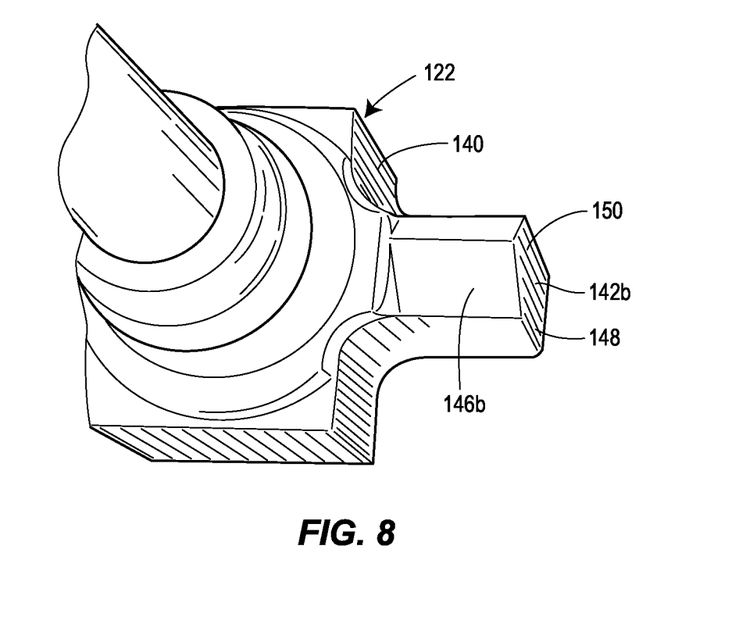
FIG. 8 is a partial perspective view of the pivot body of FIG. 6.

As shown in FIGS. 6-8, one version of the pivot base 120 and pivot body 122 of the present disclosure will be described in more detail. The pivot base 120 includes a solid piece of material including a cylindrical base member 128 having a cylindrical through-bore 130. The cylindrical base member 128 includes a support portion 128a and a reduced diameter portion 128b. When installed into the connector body 102, as shown in FIG. 5, for example, the support portion 128a resides within the inboard portion 110 of the mounting through-bore 106 and against the first shoulder surface 116, while the reduced diameter portion 128b resides in the throat portion 114. Moreover, when installed, the cylindrical base member 128 is disposed on the longitudinal axis L and coaxially with the mounting through-bore 106 of the connector body 102.

As illustrated in FIGS. 6 and 7, the support portion 128a of the cylindrical base member 128 of the presently disclosed version of the pivot base 102 includes the axial end surface 132, which is disposed opposite the support portion 128 from reduced diameter portion 128b. The axial end surface 132 includes an annular recess 133 defined by the cylindrical through-bore 130, and which terminates at a shoulder surface 135. Additionally, the axial end surface 132 defines first and second grooves 134a, 134b extending along a transverse axis T that intersects the longitudinal axis L. Thus, as shown in the depicted form, the first and second grooves 134a, 134b are spaced approximately 180° apart relative to the longitudinal axis L. In the disclosed version, the transverse axis T is disposed perpendicular to the longitudinal axis L. The first and second grooves 134a, 134b, as shown, include V-shaped cross-sections defined by interior sidewalls 136a, 136b meeting at a valley 138 that is a straight line. The interior sidewalls 136a, 136b can be disposed at a first angle α (shown in FIG. 6) relative to each other.

Still referring to FIG. 6 and also now to FIG. 8, the pivot body 120 of the presently disclosed version of the pivot and seal assembly 104 includes a cylindrical body member 140, first and second pivot body arms 142a, 142b, and a cylindrical through-bore 144. The cylindrical through-bore 144 is partially defined by a cylindrical shroud 145 (see, e.g., FIG. 6) that extends from the cylindrical body member 140. As shown in FIGS. 4 and 5, for example, the cylindrical through-bore 144 extends completely through the cylindrical body member 140 and is adapted to be disposed along the longitudinal axis L coaxial with the cylindrical through-bore 130 of the pivot base 120 and mounting through-bore 106 of the connector body 102 when mounted in the connector body 102 and when the displacer rod 16 also resides on the longitudinal axis L. The first and second pivot body arms 142a, 142b extend radially outward from opposite sides of the cylindrical body member 140. That is, the first and second pivot body arms 142a, 142b are disposed approximately 180° apart around the circumference of the cylindrical body member 140.

As depicted most clearly in FIGS. 6 and 8, the first and second pivot body arms 142a, 142b include first and second knife edges 146a, 146b, respectively. In the disclosed form, each knife edge 146a, 146b is a straight line. When assembled into the connector body 102 adjacent to the pivot base 120, as shown in FIG. 5, for example, each of the knife edges 146a, 146b extends along the transverse axis T of the pivot base 120 and in line contact with the first and second grooves 134a, 134b, respectively. More specifically, the first knife edge 134a is disposed in line contact with the valley 138 of the first groove 134a and the second knife edge 134b is disposed in line contact with the valley 138 of the second groove 134b. So configured, the pivot body 122 can pivot relative to the pivot base 120 about a pivot axis P that is coaxial with the transverse axis T.

Still referring to FIG. 6, the disclosed version of the first and second pivot body arms 142a, 142b include generally rectangular or square flange portions 148 and converging knife portions 150. The flange portions 148 extend radially outward from the cylindrical body member 140 and the knife portions 150 extend from the flange portions 148 in a direction parallel to the longitudinal axis L. The knife portions 150 each include exterior sidewalls 152a, 152b converging into a linear peak 154 that defines the respective knife edges 146a, 146b. In the disclosed version, the exterior sidewalls 152a, 152b of the of the knife portions 150 are disposed at an angle β relative to each other, which is smaller than the angle α between the interior sidewalls 136a, 136b of the first and second grooves 134a, 134b on the pivot base 120. So configured, when the knife edges 146a, 146b are disposed in the grooves 134a, 134b and in line contact with the valleys 138, the pivot body 122 has a pivoting range of motion that is dependent on the difference between angle α and angle β. Further, the line of contact formed by the knife edges 146a, 146b and valleys 138 advantageously provide a substantially frictionless interface that can function with or without lubrication. Moreover, this design is not as susceptible to trapping particulates between the pivot body 122 and the pivot base 120, which can interfere with the proper operation of the assembly. Additionally, the V-shaped grooves 134a, 134b in combination with the V-shaped knife edges 146a, 146b advantageously cooperate to prevent radial misalignment of the pivot body 122 and pivot base 120, thereby ensuring accurate and repeatable functionality.

With the pivot base 120 and pivot body 122 described as set forth above, each is adapted to be mounted in the mounting through-bore 106 of the connector body 102, as shown in FIGS. 4 and 5. That is, the reduced diameter portion 128b of the pivot base 120 is adapted to be disposed in the throat portion 114 of the mounting through-bore 102, while the support portion 128a resides in the inboard portion 110 of the mounting through-bore 106 and in abutting engagement with the first shoulder surface 116. As also shown in FIG. 5, the reduced diameter portion 128b of the pivot base 120 can include an annular recess 156 accommodating an annular seal member 158, which provides a fluid tight seal between an outer cylindrical surface 160 of the pivot base 120 and an inner cylindrical surface 162 of the throat portion 114 of the mounting through-bore 106. In some versions, the annular seal member 158 can include an elastomeric o-ring, for example. Additionally, in some versions, the annular recess 156 can also accommodate a back-up ring 164 disposed axially adjacent to the annular seal member 158.

The pivot body 122, as shown, is disposed entirely in the inboard portion 110 of the mounting through-bore 106 and axially adjacent to and in contact with the pivot base 120. More specifically, as depicted, the knife edges 146a, 146b of the pivot body arms 142a, 142b of the pivot body 122 are positioned in the V-shaped grooves 134a, 134b, respectively, of the pivot base 120. As such, the knife edges 146a, 146b and the valleys 138 of the v-shaped grooves 134a, 134b reside along a common line that coincides with the transverse axis T, as discussed above.

In addition to the knife edges 142a, 142b contacting the pivot base 120, as mentioned, the pivot body 122 and pivot base 120 are operably coupled via a seal system 166 residing in the annular recess 133 formed in the cylindrical though-bore 130 adjacent to the axial end surface 132 of the pivot base 120. As shown in FIG. 5, one version of the seal system 166 can include a retaining ring 168, an anti-extrusion ring 170, and an annular seal member 172. The retaining ring 168 is disposed in the annular recess 133 and in abutting engagement with the shoulder surface 135. The anti-extrusion ring 170 is disposed in the annular recess 133 and in abutting engagement with the retaining ring 168. Finally, the annular seal member 172, which can be an elastomeric o-ring, for example, is disposed in the annular recess 133 and in abutting engagement with the anti-extrusion ring 170.

So configured, the annular seal member 172 resides adjacent to the axial end surface 132 of the pivot base 120 such that an end surface 174 of the shroud 145 (identified in FIG. 6) on the pivot body 122 directly contacts the annular seal member 172. So assembled, the cylindrical through-bores 130, 144 of the pivot base 120 and pivot body 122 are generally in alignment along the longitudinal axis L and accommodate the displacer rod 16, as shown, for example, in FIGS. 4 and 5. That is, the displacer rod 16 extends from the first end 16a attached to the displacer 12, through the inboard portion 110 of the mounting through-bore 106 of the connector body 102, through the cylindrical through-bores 130, 144 of the pivot base 120 and pivot body 122, respectively, intersecting the transverse axis T, and out through the outboard portion 112 of the mounting through-bore 106 of the connector body 102. So configured, the first and second ends 16a, 16b of the displacer rod 16 are disposed on opposite sides of the connector body 102. Thus, the second end 16b can be operably coupled to the controller 14 in a conventional manner.

To maintain the positional relationship of the displacer rod 16 and pivot body 122 relative to the pivot base 120 and connector body 102, the displacer rod 16 includes a necked down portion 176 in the region of the cylindrical through-bores 130, 144 in the pivot base 120 and pivot body 122, as shown in FIG. 5. This necked down portion 176 defines a tapered shoulder surface 178 disposed in contact with an inboard end 180 of the pivot body 122.

In addition, as shown in FIG. 4, the second end 16b of the displacer rod 16 includes a hex nut 182, a spacer 184, and a spring 186. The spring 186 can include a coil spring and is disposed on the displacer rod 16 in abutment with the second shoulder surface 118 of the connector body 102, as shown. The hex nut 182 is threaded onto and fixed to the second end 16b of the displacer rod 16. The spacer 184 can include a hollow sleeve disposed over the displacer rod 16 between the hex nut 182 and the spring 186. So configured, the spring 186 bears on the second shoulder surface 118 of the connector body 102 and applies a force to the spacer 184, which in turn, applies a force to the hex nut 182, to bias the second end 16b of the displacer rod 16 away from the connector body 102. This biasing force in turn biases the tapered shoulder surface 178 on the displacer rod 16 into sealing engagement with the annular seal member 172 carried in the annular recess 133 of the cylindrical through-bore 130 of the pivot base 120. So configured, the displacer rod 16 is fixedly coupled to the pivot body 122 and the annular seal member 172 provides a consistent fluid tight seal between the displacer rod 16 and the pivot body 120.

Thus, referring back to FIG. 4, it should be appreciated that when the disclosed pivot support assembly 100 is fixed to a pressurized storage tank (not shown), at least the displacer 12 is positioned within a fluid that generates a buoyancy force. That buoyancy force acts on the displacer 12 in a direction out of the page relative to the orientation of FIG. 4. As the magnitude of the buoyancy force changes, as a result of the level of liquid in the storage tank changing, for example, the displacer 12 in FIG. 4 may move slightly out of and into the page. This movement is imparted also on the first end 16a of the displacer rod 16. Because the displacer rod 16 is a rigid rod, the second end 16b moves the same amount as the first end 16a, but in the opposite direction. The "fulcrum" of this movement is the transverse axis T, where the knife edges 146a, 146b of the pivot body 122 are disposed in line contact with the valleys 138 of the V-shaped grooves 134a, 134b in the pivot base 120.

As mentioned, the disclosed pivot support assembly 100 is configured for use in connection with a high-pressure storage tank such as an oil and gas or oil, gas, and water separator, for example. Moreover, as mentioned, the connector body 102 is adapted to be mounted in an opening formed in a sidewall of such a tank. Therefore, when mounted, the inboard portion 110 of the mounting through-bore 106 in the connector body 102 is exposed to the same high pressure that is resident in the tank. As such, the pressure in the tank also forces the pivot body 122 against the pivot base 120 and, more particularly, the knife edges 146a, 146b of the pivot body 122 against the valleys 138 of the v-shaped grooves 134a, 134b of the pivot base 120. Thus, one advantage of the knife edge design disclosed herein is that the unbalanced pressure applied to the pivot body 122 by the fluid in the tank is distributed across the linear dimension of the knife edges 146a, 146b and valleys 138. This distribution of force can help minimize the chances that the peaks 154 of the knife edges 146a, 146b will become deformed under the high pressures. Accordingly, in some versions, maximizing the linear dimension of the peaks 154 of the knife edges 146a, 146b can advantageously increase the useful life of the pivot and seal assembly 104. In the disclosed version of the pivot and seal assembly 104, a length L1 of each of the knife edges 146a, 146b along the transverse axis T is approximately equal to a length L2 of the v-shaped grooves 134a, 134b along the transverse axis T.

While the knife edges 146a, 146b have thus far been described as including linear peaks 154, other versions could possibly be shaped differently such as including serrated teeth, rounded teeth, or some other suitably configuration. Moreover, while the grooves 134a, 134b have been described as including V-shaped cross-section, other versions could include U-shaped cross-sections or some other shape suitable for the intended purpose.

Figure 9:
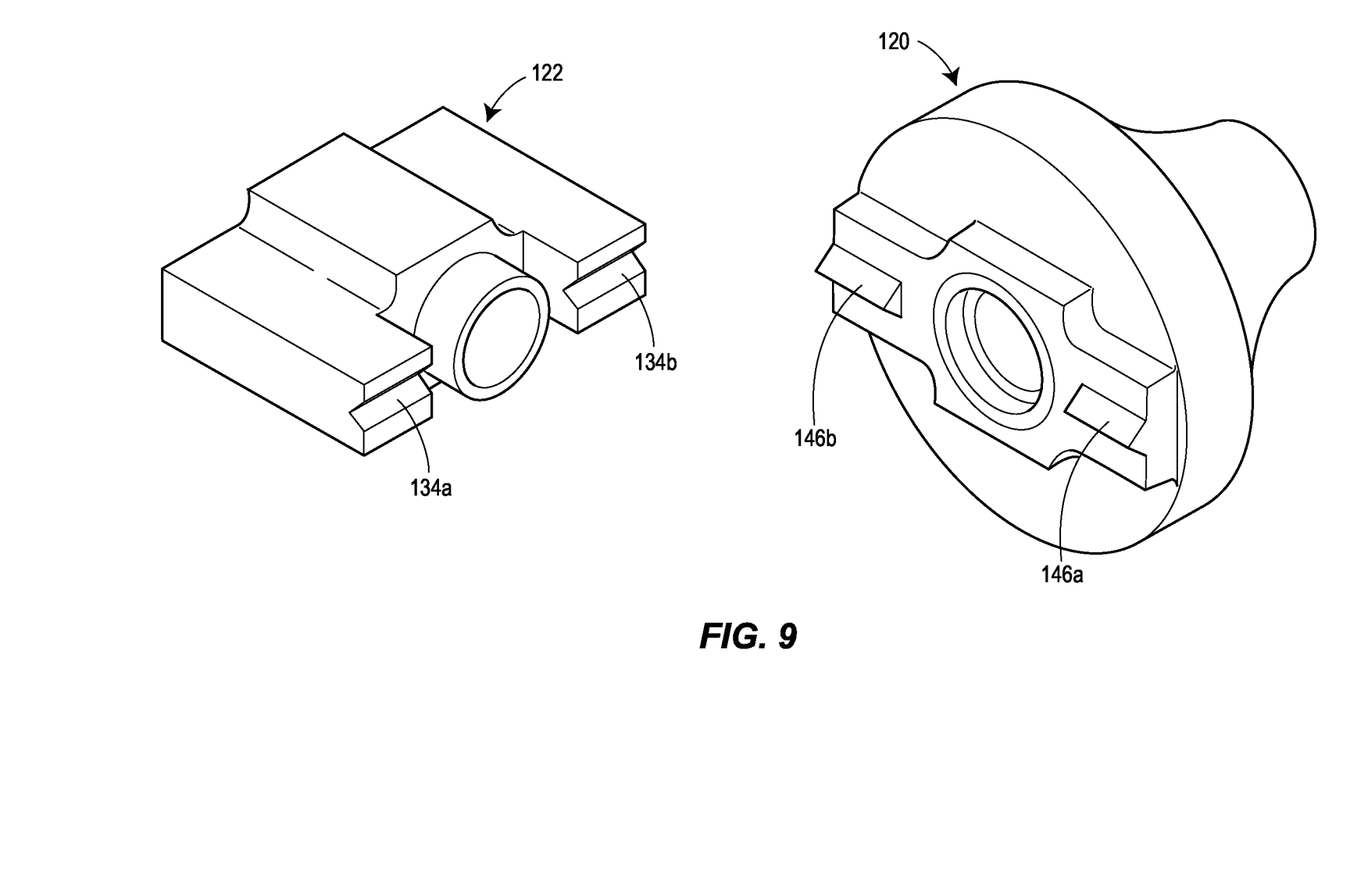
FIG. 9 is a perspective view of one alternative version of the pivot base and pivot body of FIG. 6 and constructed in accordance with the principles of the present disclosure.

Furthermore, while the present disclosure has thus far described the pivot body 122 as including the knife edges 146a, 146b and the pivot base 120 as including the v-shaped grooves 134a, 134b, an alternative version could be constructed such that the pivot base 120 includes the knife edges 146a, 146b and the pivot body 122 includes the v-shaped grooves 134a, 134b, as depicted in FIG. 9, for example. Yet another version of the disclosed pivot support assembly 100 could be constructed without the v-shaped grooves 134a, 134b and knife edges 146a, 146b.

Figure 10:
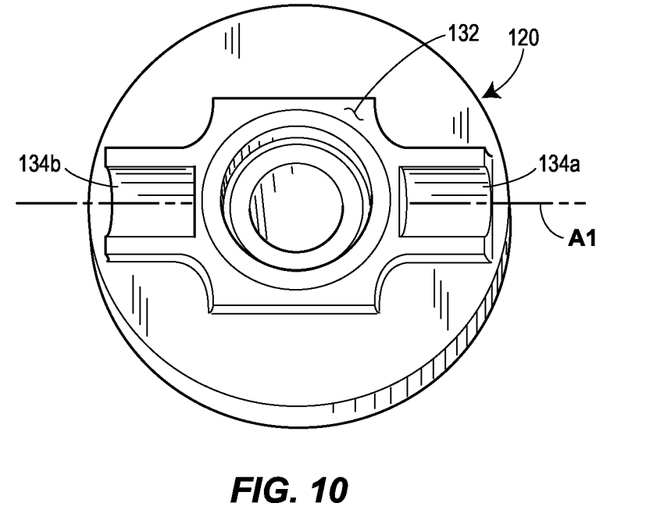
FIG. 10 is an end view of an alternative pivot base constructed in accordance with the principles of the present disclosure.
Figure 11:
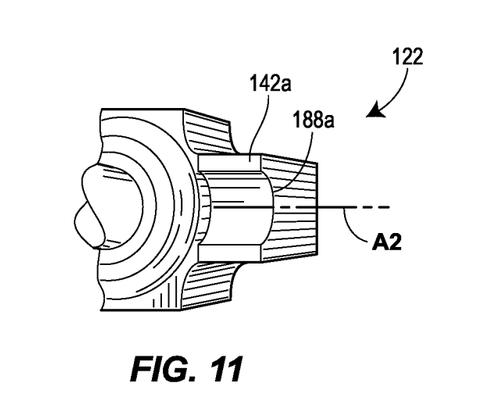
FIG. 11 is a partial perspective view of an alternative pivot body for cooperating with the pivot base of FIG. 10.

For example, FIGS. 10-12 illustrate one alternative version of the pivot support assembly 100, wherein all features are identical to that described above with the exception that the version in FIGS. 10-12 do not include V-shaped grooves 134a, 134b and knife edges 146a, 146b. Instead, as shown in FIG. 10, the grooves 134a, 134b formed in the axial end surface 132 of the pivot base 120 include semi-circular shaped cross-sections having a radius centered about an axis A1. Moreover, the pivot body arms 142a, 142b of the pivot body 122 include corresponding first and second grooves 188a, 188b, respectively, that also include semi-circular shaped cross-sections having a radius centered about an axis A2. The radius of the grooves 134a, 134b in the pivot base 120 can be substantially identical to the radius of the grooves 188a, 188b in the pivot body 122. FIG. 11 only illustrates the first pivot body arm 142a, but it should be appreciated that the second pivot body arm 142b is substantially identical. Finally, to facilitate pivotal movement of the pivot body 122 relative to the pivot base 120 when installed into the connector body 102, as shown in FIGS. 4 and 5, this alternative version of the pivot support assembly 100 also includes first and second barrel pivots 190a, 190b. The first and second barrel pivots 190a, 190b include cylindrical members that are disposed between the grooves 134a, 134b on the pivot base 120 and the grooves 188a, 188b of the pivot body 122 when the pivot base 120, pivot body 122, and barrel pivots 190a, 190b are installed within the connector body 102. In some versions, the grooves 134a, 134b, 188a, 188b can have a radius that is larger than a radius of the barrel pivots 190a, 190b such that there is only a line of contact between the pivot body 122 and barrel pivots 190a, 190b and between the pivot base 120 and the barrels 190a, 190b. In other versions, the radiuses of the grooves 134a, 134b, 188a, 188b can be approximately equal to a radius of the barrel pivots 190a, 190b such that there is a surface contact between the barrel pivots 190a, 190b and pivot body 122 and pivot base 120.

Figure 12:
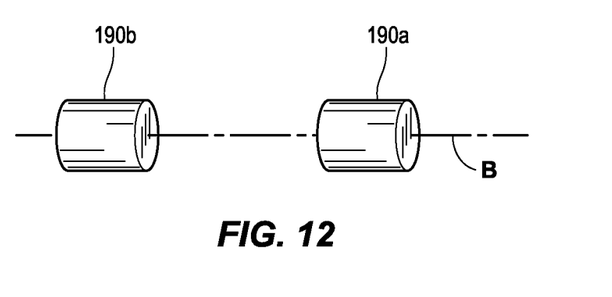
FIG. 12 is a perspective view of a pair of barrel pivots for cooperating with the pivot base and pivot body of FIGS. 10 and 11.

Additionally, when installed, a longitudinal axis B of the barrel pivots 190a, 190b would be installed along the transverse axis T, as well as along the axes A1, A2 of the grooves 134a, 134b, 188a, 188b. That is, when installed, the three axes A1, A2, and B are co-aligned and in alignment with the transverse axis T. It is foreseeable that the barrel pivots 190a, 190b could be constructed of PEEK, stainless steel, ceramic, or any other material suitable for the intended purpose, and could include grease or another lubricant to facilitate movement of the pivot body 122.

Based on the foregoing it should be appreciated that the present disclosure provides a displacement level assembly and pivot and seal assembly for a displacement lever assembly, which is reliable, accurate, and robust even in high-pressure environments. It should further be appreciated that the foregoing disclosure is not limited to the examples expressly described and/or depicted, but rather, is intended to include all modifications, variations, combinations, or other changes that fall within the spirit and scope of the following claims.

What is claimed:

1. A seal and pivot assembly for a displacement lever assembly, the seal and pivot assembly comprising:
   a pivot base comprising a cylindrical base member disposed on a longitudinal axis, an axial end surface, and a cylindrical through-bore extending through the cylindrical base member along the longitudinal axis, the axial end surface defining first and second grooves, each having a semi-circular shaped cross-section with a radius about a first transverse axis of the pivot base that is perpendicular to the longitudinal axis;
   an annular seal member carried within the through-bore of the cylindrical base member of the pivot base;
   a pivot body comprising a cylindrical body member disposed on the longitudinal axis, first and second pivot body arms extending radially outward from opposite sides of the cylindrical body member, and a cylindrical through-bore extending through the cylindrical body member along the longitudinal axis coaxially with the cylindrical through-bore of the cylindrical base member, the first and second pivot body arms including third and fourth grooves, respectively, each having a semi-circular shaped cross-section with a radius about a second transverse axis;
   first and second cylindrical barrel pivots having longitudinal axes disposed on a third transverse axis, the first barrel pivot disposed between the first and third grooves and the second barrel pivot disposed between the second and fourth grooves to facilitate pivoting movement of the pivot body relative to the pivot base.

2. The seal and pivot assembly of claim 1, further comprising a displacer rod extending through the cylindrical through-bores of the cylindrical base and body members and intersecting the transverse axis.

3. The seal and pivot assembly of claim 2, wherein the displacer rod is fixedly coupled to the pivot body.

4. The seal and pivot assembly of claim 1, wherein the annular seal member sealingly engages an outer cylindrical surface of the displacer rod and an inner cylindrical surface of the pivot base to provide a fluid tight seal therebetween.

5. The seal and pivot assembly of claim 4, wherein the annular seal member is disposed axially between the pivot base and the pivot body.

6. The seal and pivot assembly of claim 5, wherein the annular seal member is an o-ring.

7. The seal and pivot assembly of claim 1, wherein the first, second and third transverse axes are co-aligned.

8. The seal and pivot assembly of claim 1, wherein the radiuses of the first, second, third and fourth grooves are larger than the radiuses of the first and second barrel pivots.

9. The seal and pivot assembly of claim 8, wherein a line of contact exists between the pivot body and the barrel pivots and between the pivot base and the barrel pivots.

10. The seal and pivot assembly of claim 1, wherein the radiuses of the first, second, third and fourth grooves are approximately equal to the radiuses of the first and second barrel pivots.

11. The seal and pivot assembly of claim 10, wherein a surface contact exists between the pivot body and the barrel pivots and between the pivot base and the barrel pivots.

12. A displacement level assembly for detecting fluid levels in a pressurized storage tank, the displacement level assembly comprising:
   a connector body having a mounting through-bore extending along a longitudinal axis, the connector body for being mounted to a storage tank;
   a pivot base fixedly mounted in the mounting through-bore of the connector body, the pivot base comprising a cylindrical base member disposed on the longitudinal axis, an axial end surface, and a cylindrical through-bore extending through the cylindrical base member along the longitudinal axis, the axial end surface defining first and second grooves, each having a semi-circular shaped cross-section with a radius about a first transverse axis of the pivot base that is perpendicular to the longitudinal axis;
   a pivot body disposed within the mounting through-bore of the connector body at a location axially adjacent to the pivot base, the pivot body comprising a cylindrical body member disposed on the longitudinal axis, first and second pivot body arms extending radially outward from opposite sides of the cylindrical body member, and a cylindrical through-bore extending through the cylindrical body member along the longitudinal axis coaxially with the cylindrical through-bore of the cylindrical base member, the first and second pivot body arms including third and fourth grooves, respectively, each having a semi-circular shaped cross-section with a radius about a second transverse axis;
   first and second cylindrical barrel pivots having longitudinal axes disposed on a third transverse axis, the first barrel pivot disposed between the first and third grooves and the second barrel pivot disposed between the second and fourth grooves to facilitate pivoting movement of the pivot body relative to the pivot base;
   a displacer rod extending through the cylindrical through-bores of the cylindrical base and body members along the longitudinal axis and intersecting the transverse axis, the displacer rod having a first end disposed opposite the pivot body from the pivot base and a second end opposite the first end;

a displacer attached to the first end of the displacer rod for being disposed in the pressurized storage tank; and a controller operably coupled to the second end of the displacer rod for receiving displacement signals from the displacer via the displacer rod.

13. The displacement level assembly of claim 12, wherein the displacer rod is fixedly coupled to the pivot body.

14. The displacement level assembly of claim 12, further comprising a first annular seal member carried within the through-bore of the cylindrical base member of the pivot base.

15. The displacement level assembly of claim 14, wherein the first annular seal member sealingly engages an outer cylindrical surface of the displacer rod and an inner cylindrical surface of the pivot base to provide a fluid tight seal therebetween.

16. The displacement level assembly of claim 15, wherein the first annular seal member is disposed axially between the pivot base and the pivot body.

17. The displacement level assembly of claim 16, wherein the first annular seal member is an o-ring.

18. The displacement level assembly of claim 14, further comprising a second annular seal member disposed between an outer cylindrical surface of the pivot base and an inner cylindrical surface of the mounting through-bore in the connector body to provide a fluid tight seal therebetween.

19. The displacement level assembly of claim 12, wherein the controller includes a spring contacting the second end of the displacer rod to counterbalance the weight of the displacer attached to the first end of the displacer rod.

20. The displacement level assembly of claim 12, wherein the first, second and third transverse axes are co-aligned.

21. The displacement level assembly of claim 12, wherein the radiuses of the first, second, third and fourth grooves are larger than the radiuses of the first and second barrel pivots.

22. The displacement level assembly of claim 21, wherein a line of contact exists between the pivot body and the barrel pivots and between the pivot base and the barrel pivots.

23. The displacement level assembly of claim 12, wherein the radiuses of the first, second, third and fourth grooves are approximately equal to the radiuses of the first and second barrel pivots.

24. The displacement level assembly of claim 23, wherein a surface contact exists between the pivot body and the barrel pivots and between the pivot base and the barrel pivots.

\* \* \* \* \*